(12) United States Patent
Kuo

(10) Patent No.: US 8,483,144 B2
(45) Date of Patent: Jul. 9, 2013

(54) METHOD FOR ENHANCING RRC PROCEDURE RE-INITIATION EFFICIENCY IN A WIRELESS COMMUNICATIONS SYSTEM AND RELATED APPARATUS

(75) Inventor: Richard Lee-Chee Kuo, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 713 days.

(21) Appl. No.: 12/275,231

(22) Filed: Nov. 21, 2008

(65) Prior Publication Data

US 2009/0135775 A1 May 28, 2009

Related U.S. Application Data

(60) Provisional application No. 60/989,810, filed on Nov. 22, 2007.

(51) Int. Cl.
*H04W 4/00* (2009.01)

(52) U.S. Cl.
USPC ........................................................ 370/329

(58) Field of Classification Search
USPC ........................................................ 370/329
See application file for complete search history.

(56) References Cited

U.S. PATENT DOCUMENTS

| 2010/0067498 | A1* | 3/2010 | Lee et al. | 370/336 |
| 2010/0189071 | A1* | 7/2010 | Kitazoe | 370/331 |
| 2010/0278143 | A1* | 11/2010 | Chun et al. | 370/331 |

FOREIGN PATENT DOCUMENTS

| JP | 2005512875 A | 5/2005 |
| JP | 2007166232 A | 6/2007 |
| WO | 2007126301 A1 | 11/2007 |

OTHER PUBLICATIONS

3GPP: "3rd Generation Partnership Project; Technical Specification Group Radio Access Network; Evolved Universal Terrestrial Radio Access (E-UTRA) Radio Resource Control (RRC); Protocol Specification (Release 8)", Draft 3GPP TS 36.331 V0.4.1 (Nov. 2007), XP002552846, Retrieved from the internet.

Himke Vandervelde: "Re: Updated E-UTRA RRC specification, after RAN2#60 meeting", 3GPP TSG RAN WG2, Nov. 19, 2007, pp. 1-7, XP002552847, Retrieved from the internet.

Motorola et al: "E-UTRA Random Access Channel TP", 3GPP TSG RAN1#44-bis, R1-061083, Mar. 27-30, 2006, XP050101973, Athens, Greece.

Nokia: "Non-synchronized random access procedure", 3GPP TSG RAN WG1 LTE Ad Hoc, R1-061901, Jun. 27-30, 2006, pp. 1-4, XP002503578, Cannes, France.

3GPP: "3rd Generation Partnership Project; Technical Specification Group Radio Access Network; Evolved Universal Terrestrial Radio Access (E-UTRA) Medium Access Control (MAC) protocol specification (Release 8)", 3GPP TS 36.321 V2.0.0 (Nov. 2007), pp. 1-23, XP002521802, Retrieved from the Internet.

(Continued)

*Primary Examiner* — Farah Faroul
(74) *Attorney, Agent, or Firm* — Blue Capital Law Firm, P.C.

(57) ABSTRACT

A method for enhancing efficiency of RRC (Radio Resource Control) procedure re-initiation for a user equipment (UE) in a wireless communication system is provided. The UE includes a plurality of RRC procedures, which are started with a random access preamble procedure. The method includes initiating an RRC procedure of the plurality of RRC procedures, initiating the random access preamble procedure corresponding to the initiated RRC procedure, transmitting an RRC request message corresponding to the initiated RRC procedure after completion of the random access preamble procedure e, and re-initiating the random access preamble procedure when receiving a contention resolution message which corresponds to the random access preamble procedure, but does not belong to the initiated RRC procedure.

28 Claims, 4 Drawing Sheets

OTHER PUBLICATIONS

Asustek: "Clarification on RRC Contention Resolution messages", 3GPP TSG-RAN WG2 Meeting #60bis, R2-080024, Jan. 14-18, 2008, XP050137927, Sevilla, Spain.

3GPP TS 25.331 V7.6.0 (Sep. 2007), 3rd Generation Partnership Project, Technical Specification Group Radio Access Network, Radio Resource Control (RRC), Protocol Specification (Release 7), Section 8.1.3-8.1.4.

3GPP TS 36.331 V0.3.3 (Oct. 2007), Technical Specification, 3rd Generation Partnership Project; Technical Specification Group Radio Access Network; Evolved Universal Terrestrial Radio Access (E-UTRA) Radio Resource Control (RRC); Protocol Specification (Release 8).

Ericsson, E-UTRA Random Access, 3GPP TSG-RAN WG1 #44, R1-060584, Denver, CO, USA, Feb. 13-17, 2006.

Ericsson, UE Identity Handling in LTE, 3GPP TSG-RAN WG2 Meeting #52, Tdoc R2-060969, Athens, Greece, Mar. 27-31, 2006.

3GPP, "3rd Generation Partnership Project, Technical Specification Group Radio Access Network; Evolved Universal Terrestrial Radio Access (E-UTRA) Radio Resource Control (RRC): Protocol Specification (Release 8)", Draft 3 GPP TS 36.331 Vo. 4.2 (Nov. 2007), Retrieved from the Internet.

* cited by examiner

METHOD FOR ENHANCING RRC PROCEDURE RE-INITIATION EFFICIENCY IN A WIRELESS COMMUNICATIONS SYSTEM AND RELATED APPARATUS

CROSS REFERENCE TO RELATED APPLICATIONS

This application claims the benefit of U.S. Provisional Application No. 60/989,810, filed on Nov. 22, 2007 and entitled "Method and Apparatus for Improving RRC Connection Re-establishment Procedure and RRC Connection Reconfiguration Procedure in a Wireless Communication System", the contents of which are incorporated herein by reference.

BACKGROUND OF THE INVENTION

1. Field of the Invention

The present invention relates to a method for enhancing efficiency and related apparatus, and more particularly, to a method for enhancing efficiency of RRC procedure re-initiation for a user equipment (UE) in a wireless communications system and related apparatus.

2. Description of the Prior Art

The third generation mobile telecommunications system (called 3G system) provides high frequency spectrum utilization, universal coverage, and high quality, high-speed multimedia data transmission, and also meets all kinds of QoS requirements simultaneously, providing diverse, flexible, two-way transmission services and better communication quality to reduce transmission interruption rates.

Long Term Evolution wireless communications system (LTE system), an advanced high-speed wireless communications system established upon the 3G mobile telecommunications system, supports only packet-switched transmission, and tends to implement both Medium Access Control (MAC) layer and Radio Link Control (RLC) layer in one single communication site, such as in Node B alone rather than in Node B and RNC (Radio Network Controller) respectively, so that the system structure becomes simpler.

In the LTE system, the Radio Resource Control (RRC) layer, a Layer 3 protocol, is the core of communications protocols related to Access Stratum (AS) and is located in radio network controllers (RNC) of the UNITS Terrestrial Radio Access Network (UTRAN) and a user equipment (UE). The RRC layer uses RRC messages to perform RRC procedures. RRC messages are formed from many information elements (IEs) used for embedding necessary information for setting, changing, or releasing protocol entities of Layer 2 and Layer 1, thereby establishing, adjusting, or canceling information exchange channels to perform data packet transportation.

When a UE performs a certain RRC procedure, a random access procedure is initiated accordingly, which includes a random access preamble procedure. The random access preamble procedure of the UE preferably includes transmitting a random access preamble to an evolved Node B (eNB), and receiving a random access response from the eNB.

Take a UE performing the RRC connection establishment procedure as an example. The UE transmits a random access preamble to an eNB, and after the eNB responds a random access response, the UE transmits an RRC connection request message to the eNB for establishing RRC connection. If the eNB accepts the RRC connection request, the eNB responds a RRC Connection Setup message to accomplish the RRC connection establishment procedure.

In addition, other UEs may simultaneously perform RRC procedures (such as RRC connection re-establishment procedure) initiated with a random access preamble procedure, and thereby transmits the same random access preamble on a random access channel (RACH). In this situation, the network cannot distinguish the random access preambles transmitted from different UEs, which causes contention between the UEs initiating different RRC procedures. Therefore, after receiving the random access response from eNB, each UE transmits a corresponding RRC request message (e.g. the RRC connection request message for the RRC connection establishment procedure or the RRC connection re-establishment request for the RRC connection re-establishment procedure) to the eNB. Note that, the RRC connection request or RRC connection re-establishment request message carries an initial UE identity of the UE. Although the UEs transmit the RRC request messages to the eNB respectively, the eNB only responds a corresponding RRC message, such as an RRC Connection Setup or an RRC Connection Re-establishment message, to the winner UE. In addition, the responded RRC Connection Setup or RRC Connection Re-establishment message carries the initial UE identity of the winner UE.

After the UE transmits an RRC request message (e.g. RRC connection request), and receives a response message (e.g. RRC Connection Setup) corresponding to the request message, the UE compares the initial UE identity in the transmitted RRC connection request with the initial UE identity in the received response message. If the initial UE identities are the same, namely the UE is a winner of the contention, the UE can continue performing RRC procedure. However, if the initial UE identities are different, namely the UE is a loser of the contention, the UE needs to re-initiate the random access preamble procedure immediately for restart of RRC procedure. When the UE transmits the RRC request message, a timer is started. If the UE does not receive the response message corresponding to the request message before the timer expired, the UE is considered as a loser of the contention and the random access preamble procedure is re-initiated. Since the response message can be used for determining the result of contention of UEs, the response message is called a contention resolution message.

In the prior art, if the UE receives the response message which is not expected (such as if the UE transmits the RRC connection request, but receives the RRC Connection Re-establishment, or if the UE transmits the RRC connection re-establishment request, but receives the RRC Connection Setup), the UE does not respond. Since the UE receives the unexpected response message and thereby does not respond, the UE does not re-initiate the random access preamble procedure to restart the RRC procedure until the timer expires, which causes a time delay of RRC procedure re-initiation and affects quality of the wireless communication service.

SUMMARY OF THE INVENTION

The present invention discloses a method for enhancing efficiency of RRC procedure re-initiation for a UE in a wireless communication system. The UE includes a plurality of RRC procedures, which start with a random access preamble procedure. The method includes initiating an RRC procedure of the plurality of RRC procedures, initiating the random access preamble procedure corresponding to the initiated RRC procedure, transmitting an RRC request message corresponding to the initiated RRC procedure after completion of the random access preamble procedure, and re-initiating the random access preamble procedure when receiving a contention resolution message which corresponds to the random access preamble procedure, but does not belong to the initiated RRC procedure.

The present invention further discloses a communication device utilized in a wireless communication. The communication device includes a processor for executing a process, and a storage device coupled to the processor. The storage device is used for storing a program code comprising a plurality of RRC procedures started with a random access preamble procedure, and the processor executes the process according to the program code. The process includes initiating an RRC procedure of the plurality of RRC procedures, initiating the random access preamble procedure corresponding to the initiated RRC procedure, transmitting an RRC request message corresponding to the initiated RRC procedure after completion of the random access preamble procedure procedure, and re-initiating the random access preamble procedure when receiving a contention resolution message which corresponds to the random access preamble procedure, but does not belong to the initiated RRC procedure.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
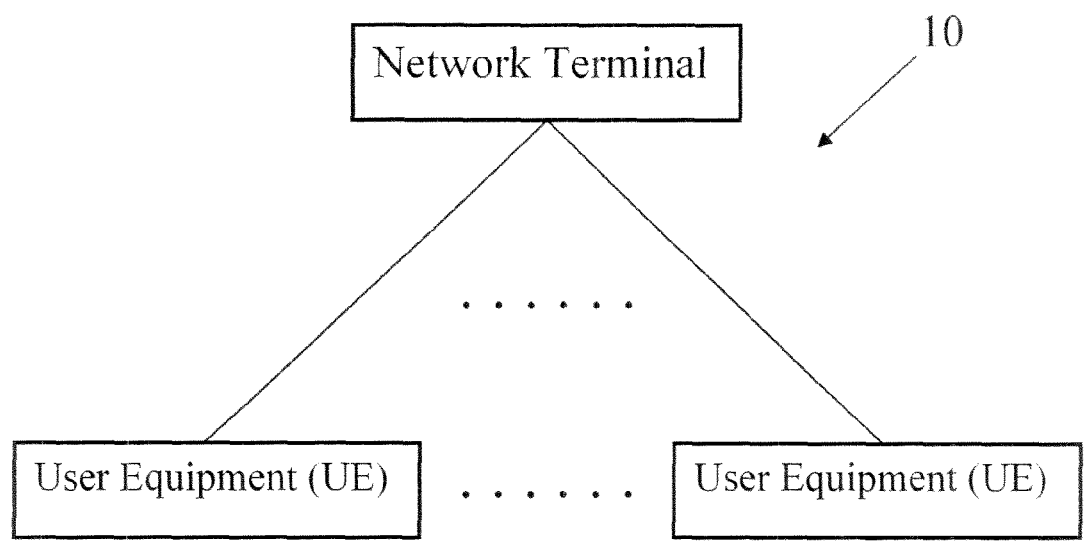
FIG. 1 is a schematic diagram of a wireless communication system.

Please refer to FIG. 1, which is a schematic diagram of a wireless communications system. The wireless communications system 10 is preferred to be a LTE system, and is briefly formed with a network terminal and a plurality of user equipments. In FIG. 1, the network terminal and the user equipments (UEs) are simply utilized for illustrating the structure of the wireless communications system 10. Practically, the network terminal may include a plurality of base stations, radio network controllers, and so on according to actual demands, and the UEs can be apparatuses such as mobile phones, computer systems, etc.

Figure 2:
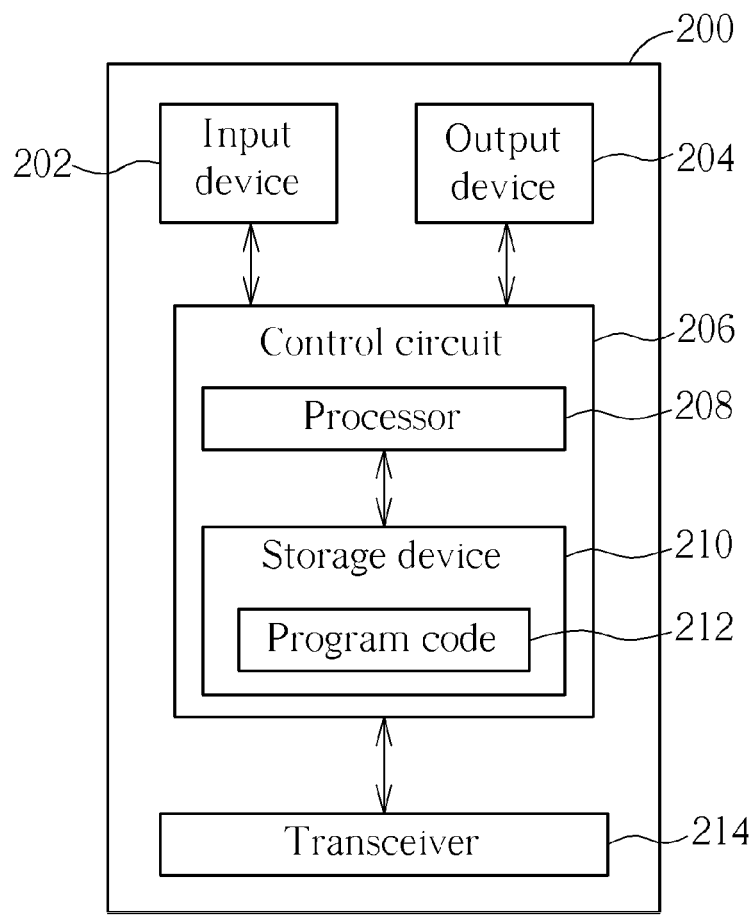
FIG. 2 is a functional block diagram of a wireless communication device.

Please refer to FIG. 2, which is a functional block diagram of a communications device. The communications device 200 can be a UE of the wireless communications system 10. For the sake of brevity, FIG. 2 only shows an input device 202, an output device 204, a control circuit 206, a processor 208, a storage device 210, a program code 212, and a transceiver 214 of the communications device 200. In the communications device 200, the control circuit 206 executes the program code 212 in the storage device 210 through the processor 208 for executing a process, thereby controlling an operation of the communications device 200. The communications device 200 can receive signals inputted by a user through the input device 202, such as a keyboard, and can output images and sounds through the output device 204, such as a monitor or speakers. The transceiver 214 is used for receiving and transmitting wireless signals, delivering received signals to the control circuit 206, and outputting signals generated by the control circuit 206 wirelessly. From a perspective of a communications protocol framework, the transceiver 214 can be seen as a portion of Layer 1, and the control circuit 206 can be utilized to realize functions of Layer 2 and Layer 3.

Figure 3:
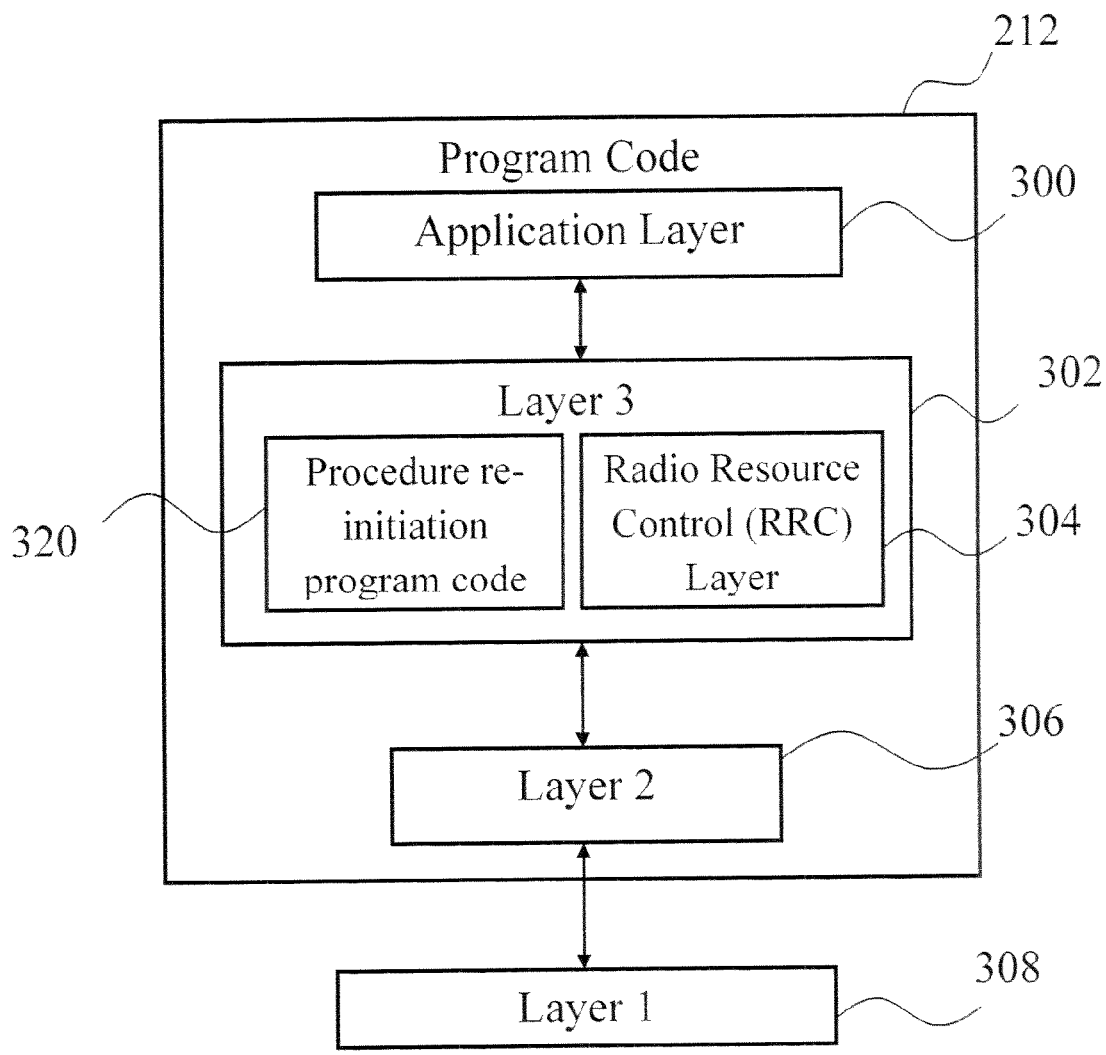
FIG. 3 is a schematic diagram of a program code shown in FIG. 2.

Please continue to refer to FIG. 3, which is a diagram of the program code 212 shown in FIG. 2. The program code 212 includes an application layer 300, a Layer 3 302, and a Layer 2 306, and is coupled to a Layer 1 308. The Layer 3 302 is utilized for realizing radio resource control, and includes a RRC layer 304, which can transform an RRC status of the communications device 200 according to network system demand or communication environment change. The Layer 2 306 is utilized for realizing radio link control and medium access control. The Layer 1 308 is utilized for realizing physical connections.

In addition, the program code 212 includes a plurality of RRC procedures utilized in the Layer 3 302, where each of the RRC procedures needs to be started with a random access preamble procedure. In certain situations, an initiated RRC procedure needs to be restarted. Therefore, the program code 212 of the embodiment of the present invention provides a procedure re-initiation program code 320 for enhancing efficiency of RRC procedure re-initiation.

Figure 4:
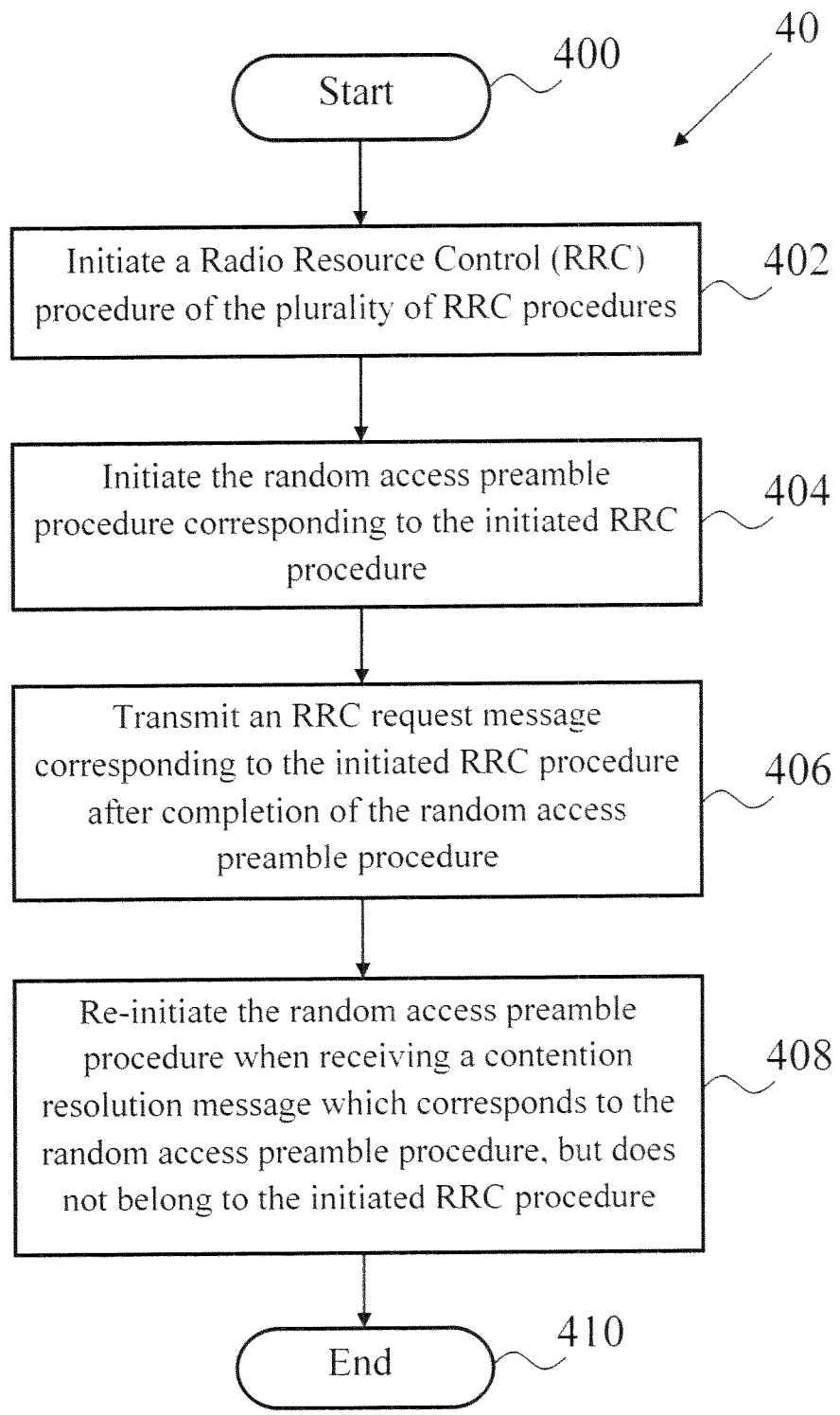
FIG. 4 is a flowchart diagram according to an embodiment of the present invention.

Please refer to FIG. 4, which is a schematic diagram of a process 40 according to an embodiment of the present invention. The process 40 is utilized in a user equipment of the wireless communication system 10 for enhancing efficiency of RRC procedure re-initiation. The process 40 can be compiled into the procedure re-initiation program code 320, and includes the following steps:

Step 400: Start.

Step 402: Initiate an RRC procedure of the plurality of RRC procedures.

Step 404: Initiate the random access preamble procedure corresponding to the initiated RRC procedure.

Step 406: Transmit an RRC request message corresponding to the initiated RRC procedure after completion of the random access preamble procedure.

Step 408: Re-initiate the random access preamble procedure when receiving a contention resolution message which corresponds to the random access preamble procedure, but does not belong to the initiated RRC procedure.

Step 410: End.

According to the process 40, the UE initiates one of the plurality of RRC procedures, and initiates the random access preamble procedure. After completion of the random access preamble procedure, the UE transmits an RRC request message according to the initiated RRC procedure. After the UE receives the contention resolution message corresponding to the random access preamble procedure, the UE immediately re-initiates the random access preamble procedure for restarting the initiated RRC procedure if the contention resolution message does not belong to the initiated RRC procedure. On the contrary, when the received contention resolution message belongs to the initiated RRC procedure, the UE preferably continues the RRC procedure if an initial UE identity included in the contention resolution message is the same as the one included in the RRC request message.

In the process 40, the random access preamble procedure includes transmitting a random access preamble, and receiving a random access response. Note that, completion of the random access preamble procedure indicates receiving a random access response, namely after receiving a random access response. In addition, the random access response includes a temporary cell radio network temporary identifier (C-RNTI).

Moreover, the plurality of RRC procedures preferably include an RRC connection establishment procedure and an RRC connection re-establishment procedure, the contention resolution messages of which respectively correspond to an RRC Connection Setup and an RRC Connection Re-establishment message. In addition, the contention resolution message includes an initial UE identity. Note that, besides the two abovementioned RRC procedures, the plurality of RRC procedures can further include other RRC procedures started with the random access preamble procedure, whose contention resolution message is different accordingly.

Furthermore, according to the process 40, when the initiated RRC procedure is the RRC connection establishment procedure, the contention resolution message is the RRC Connection Setup message. When the initial UE identity carried by the contention resolution message is the same with the initial UE identity carried by the RRC request message (RRC connection request), the UE is indicated as a winner and thereby continues the RRC connection establishment procedure. However, if the contention resolution message is not the RRC Connection Setup, the UE re-initiates the random access preamble procedure for restarting the RRC connection establishment procedure. Similarly, when the initiated RRC procedure is the RRC connection re-establishment procedure, the contention resolution message is the RRC Connection Re-establishment message. When the initial UE identity carried by the contention resolution message is the same with the initial UE identity carried by the RRC request message (RRC connection re-establishment request), the UE is indicated as a winner and thereby continues the RRC connection re-establishment procedure. However, if the contention resolution message is not the RRC Connection Re-establishment, the UE re-initiates the random access preamble procedure for restarting the RRC connection re-establishment procedure.

For clearer explanation of the present invention concept, take a UE1 performing the RRC connection establishment procedure and a UE2 performing the RRC connection re-establishment procedure as an example. The UE1 and UE2 both simultaneously initiate the random access preamble procedure, and use the same random access preamble. In this situation, a contention is incurred. The "simultaneously" here means that the random access preambles of the UE1 and UE2 are received by the eNB in a certain time slot length. If the eNB determines that the UE1 as a winner after receiving the RRC request message, the eNB responds with an RRC Connection Setup. The UE1 examines the initial UE identity in the RRC Connection Setup and the initial UE identity is the same with the initial UE identity of the RRC request message. In this situation, the UE1 continues the RRC connection establishment procedure to complete the RRC connection establishment procedure. On the contrary, since the contention resolution message received by the UE2 is not the RRC Connection Re-establishment, the UE2 fails in the contention, and thereby immediately re-initiates the random access preamble procedure to restart the RRC connection re-establishment procedure.

On the contrary, if the eNB determines that the UE2 as a winner after receiving the RRC request message, the eNB responds with an RRC Connection Re-establishment. The UE2 examines the initial UE identity in the RRC Connection Re-establishment, and finds that the initial UE identity is the same with the initial UE identity of the RRC request message. In this situation, the UE2 continues the RRC connection re-establishment procedure, whereas the UE1 re-initiates the random access preamble procedure when the RRC Connection Re-establishment is received.

In the prior art, if the UE receives an unexpected contention resolution message, the UE does not respond, and wait until a predetermined time expires for re-initiating the random access preamble procedure, to restart the RRC procedure, thereby decreasing efficiency of RRC procedure re-initiation. In comparison, the embodiment of the present invention continues RRC procedures or immediately re-initiates the random access preamble procedure for restarting the RRC procedure according to the contention resolution message. Therefore, in the embodiment of the present invention, the loser UE does not need to wait the predetermined time, but re-initiates the random access preamble procedure immediately when receiving the corresponding contention resolution message, to enhance efficiency of RRC procedure re-initiation.

In conclusion, the embodiment of the present invention continues the RRC procedure or immediately restarts the random access preamble procedure according to the contention resolution message, for enhancing efficiency of RRC procedure re-initiation and thereby increasing the quality of the wireless communication system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for enhancing efficiency of radio resource control (RRC) procedure re-initiation for a user equipment (UE) in a wireless communication system, the method comprising:
   initiating an RRC connection establishment procedure;
   initiating a random access preamble procedure corresponding to the initiated RRC connection establishment procedure;
   transmitting an RRC connection request message corresponding to the initiated RRC connection establishment procedure after completion of the random access preamble procedure; and
   re-initiating the random access preamble procedure when receiving a contention resolution message of an RRC connection re-establishment procedure initiated by a different UE.

2. The method of claim 1 further comprising:
   continuing the RRC connection establishment procedure when receiving the contention resolution message which corresponds to the random access preamble procedure and belongs to the initiated RRC connection establishment procedure, and an initial UE identity carried by the contention resolution message is the same as an initial UE identity included in the RRC connection request message.

3. The method of claim 2, Wherein the contention resolution message of the RRC connection establishment procedure is an RRC Connection Setup message.

4. The method of claim 1, wherein the contention resolution message of an RRC connection re-establishment procedure is an RRC Connection Re-establishment message.

5. The method of claim 1, wherein the random access preamble procedure comprises:
   transmitting a random access preamble; and
   receiving a random access response.

6. The method of claim 5, wherein the random access response comprises a Temporary Cell Radio Network Temporary Identifier.

7. The method of claim 1, wherein the RRC connection request message comprises an initial UE identity of the UE.

8. A communication device utilized in a wireless communication, the communication device comprising;

a processor for executing a process according to a program code; and a storage device coupled to the processor, for storing the program code;

wherein the process comprises;
- initiating an RRC connection establishment procedure;
- initiating a random access preamble, procedure corresponding to the initiated RRC connection establishment procedure;
- transmitting an RRC connection request message corresponding to the initiated RRC connection establishment procedure after completion of the random access preamble procedure; and
- re-initiating the random access preamble procedure when receiving a contention resolution message of an RRC connection re-establishment procedure initiated by a different UE.

9. The communication device of claim 8, wherein the process further comprises:
continuing the RRC connection establishment procedure when receiving the contention resolution message which corresponds to the random access preamble procedure and belongs to the initiated RRC connection establishment procedure, and an initial UE identity carried by the contention resolution message is the same as an initial UE identity included in the RRC connection request message.

10. The communication device of claim 9, wherein the contention resolution message of the RRC connection establishment procedure is an RRC Connection Setup message.

11. The communication device of claim 8, wherein the contention resolution message of an RRC connection re-establishment procedure is an RRC Connection Re-establishment message.

12. The communication device of claim 8, wherein the random access preamble procedure comprises:
transmitting a random access preamble; and
receiving a random access response.

13. The communication device of claim 12, wherein the random access response comprises a Temporary Cell Radio Network Temporary Identifier.

14. The communication device of claim 8, wherein the RRC connection request message comprises an initial UE identity of the UE.

15. A method for enhancing efficiency of radio resource control (RRC) procedure reinitiation for a user equipment (UE) in a wireless communication system, the method comprising:
initiating an RRC connection re-establishment procedure;
initiating a random access preamble procedure corresponding to the initiated RRC connection re-establishment procedure;
transmitting an RRC connection re-establishment request message corresponding to the initiated RRC connection re-establishment procedure after completion of the random access preamble procedure; and
reinitiating the random access preamble procedure when receiving a contention resolution message of an RRC connection establishment procedure initiated by a different UE.

16. The method of claim 15 further comprising:
continuing the RRC connection re-establishment procedure when receiving the contention resolution message which corresponds to the random access preamble procedure and belongs to the initiated RRC connection re-establishment procedure, and an initial UE identity carried by the contention resolution message is the same as the initial UE identity included in the said RRC connection re-establishment request message.

17. The method of claim 16, wherein the contention resolution message of an RRC connection re-establishment procedure is an RRC Connection Re-establishment message.

18. The method of claim 15, wherein the contention resolution message of an RRC connection establishment procedure is an RRC Connection Setup message.

19. The method of claim 15, wherein the random access preamble procedure comprises:
transmitting a random access preamble; and
receiving a random access response.

20. The method of claim 19, wherein the random access response comprises a Temporary Cell Radio Network Temporary Identifier.

21. The method of claim 15, wherein the RRC connection re-establishment request message comprises, an initial UE identity of the UE.

22. A communication device utilized in a wireless communication, the communication device comprising:
a processor for executing a process according to a program code; and
a storage device coupled to the processor, for storing the program code;
wherein the process comprises:
- initiating an RRC comection re-establishment procedure;
- initiating a random access preamble procedure corresponding to the initiated RRC connection re-establishment procedure;
- transmitting an RRC connection re-establishment request message corresponding to the initiated RRC connection re-establishment procedure after completion of the random access preamble procedure; and
- re-initiating the random access preamble procedure when receiving a contention resolution message of an RRC connection establishment procedure initiated by a different UE.

23. The communication device of claim 22, wherein the process further comprises:
continuing the RRC connection re-establishment procedure when receiving the contention resolution message which corresponds to the random access preamble procedure and belongs to the initiated RRC connection re-establishment procedure, and a initial LIE identity carried by the contention resolution message is the same as the initial UE identity included in the said RRC connection re-establishment request message.

24. The communication device of claim 23, wherein the contention resolution message of an RRC connection re-establishment procedure is: an RRC Connection Re-establishment message.

25. The communication device of claim 22, wherein the contention resolution message of an RRC connection establishment procedure is an RRC Connection Setup message.

26. The commnunication device of claim 22, wherein the random access preamble procedure comprises:
transmitting a random access preamble; and
receiving a random access response.

27. The communication device of claim 26, wherein the random access response comprises a Temporary Cell Radio Network Temporary Identifier.

28. The communication device of claim 22, wherein the RRC connection re-establishment request message comprises an initial UE identity of the UE.

* * * * *